(12) United States Patent
Inoue et al.

(10) Patent No.: US 6,876,481 B2
(45) Date of Patent: Apr. 5, 2005

(54) SPATIAL LIGHT MODULATOR

(75) Inventors: Mitsuteru Inoue, Tokyo (JP);
Jae-Kyong Cho, Jinju-shi (KR)

(73) Assignee: Optware Corporation, Kanagawa (JP)

( * ) Notice: Subject to any disclaimer, the term of this patent is extended or adjusted under 35 U.S.C. 154(b) by 658 days.

(21) Appl. No.: 09/878,955

(22) Filed: Jun. 13, 2001

(65) Prior Publication Data

US 2002/0192505 A1 Dec. 19, 2002

(51) Int. Cl.[7] .............................. G02F 1/07; G02F 1/09; G02B 27/28
(52) U.S. Cl. ...................... 359/281; 359/280; 359/282; 359/283; 359/250; 359/484
(58) Field of Search ................................ 359/280–284, 359/237, 238, 240, 298, 324, 250, 484

(56) References Cited

U.S. PATENT DOCUMENTS

| 4,584,237 A | 4/1986 | Pulliam | 428/336 |
|---|---|---|---|
| 5,241,421 A | 8/1993 | Endo et al. | 359/684 |
| 5,255,119 A | 10/1993 | Ross et al. | 359/280 |
| 5,386,313 A | 1/1995 | Szegedi et al. | 359/280 |
| 5,473,466 A | * 12/1995 | Tanielian et al. | 359/282 |

OTHER PUBLICATIONS

J. Park et al., "One–Dimensional Magnetophotonic Crystal Spatial Light Modulator", *The Papers of Technical Meeting On Magnetics, The Institute of Electrical Engineers of Japan*, MAG–00–151, pp. 55–60, (Jul. 2000).

J. Park et al., "Design of Drive Line Shape for Reflective Magneto–Optic Spatial Light Modulator with High Switching Sensitivity by Computer Simulation", *Journal of the Korean Magnetic Society Annual Meeting*, (Oct. 1999).

J. Park et al., "Design of Drive Line Shape for Reflective Magneto–Optic Spatial Light Modulator with High Switching Sensitivity by Computer Simulation", *Journal of Korean Magnetic Society*, vol. 10, No. 2, pp. 93–98, (Apr. 2000).

M. Inoue et al., "Development of Ultrafast Terabyte Optical Disk Storage Apparatus—Report on Research Results–", *New Energy and Industrial Technology Development Organization*, (Mar. 2001).

* cited by examiner

*Primary Examiner*—Hung Xuan Dang
*Assistant Examiner*—Joseph Martinez
(74) *Attorney, Agent, or Firm*—Oliff & Berridge, PLC

(57) ABSTRACT

A spatial light modulator includes: a magnetic layer that is made of a magneto-optic material and includes a plurality of pixels in each of which a magnetization direction is independently set and each of which has a function of causing a rotation of a polarization direction of incident light depending on the magnetization direction by a magneto-optic effect; a plurality of first conductor layers and a plurality of second conductor layers arranged to intersect with each other at positions corresponding to the individual pixels, through which currents for generating magnetic fields to set the magnetization directions in the individual pixels are passed; and a plurality of dielectric layers for enhancing the function of the pixels. A polarization direction of light incident on the spatial light modulator is rotated depending on the magnetization direction of each pixel.

12 Claims, 12 Drawing Sheets

SPATIAL LIGHT MODULATOR

BACKGROUND OF THE INVENTION

1. Field of the Invention

The present invention relates to a spatial light modulator for spatially modulating incident light.

2. Description of the Related Art

A spatial light modulator for spatially modulating incident light is used in the field of an optical information processing, a computer-generated hologram or the like.

A conventional spatial light modulator includes one using a liquid crystal and one using a micro-mirror device.

In the foregoing field of the optical information processing, the computer-generated hologram or the like, since a large amount of information must be processed at high speed, it is desirable that the spatial light modulator has a high operation speed.

However, the spatial light modulator using a liquid crystal has a problem that the operation speed is low. For example, even in the spatial light modulator using a ferroelectric liquid crystal that has a high operation speed among liquid crystals, the response time is of the order of microsecond.

The spatial light modulator using a micro-mirror device can operate at a relatively high speed. However, since this spatial light modulator is a micro machine manufactured by a highly-developed semiconductor manufacturing process and having a complicated structure, the manufacturing cost is high, and there remains a problem in reliability since it has a mechanical driving portion.

Now, for example, U.S. Pat. No. 4,584,237, No. 5,241,421, No. 5,255,119 and No. 5,386,313 disclose spatial light modulators utilizing a magneto-optic effect. Hereinafter, such a spatial light modulator is referred to as a magneto-optic spatial light modulator. The magneto-optic spatial light modulator includes a plurality of pixels each of which is made of a magneto-optic material and can independently select the magnetization direction. In the magneto-optic spatial light modulator, the polarization direction of light passing through each pixel is rotated by a predetermined angle in a direction opposite to a magnetization direction in each pixel in accordance with the Faraday effect. Accordingly, the magneto-optic spatial light modulator produces spatially modulated light by arbitrarily selecting the magnetization direction in each pixel.

In the conventional magneto-optic spatial light modulator, two kinds of conductors are provided in a grid form to intersect with each other at a position of each pixel. When magnetization in any one of the pixels is to be reversed, a current is passed through two conductors intersecting with each other at the position of the pixel, so that a magnetic field for reversing the magnetization in the pixel is produced.

In the foregoing conventional magneto-optic spatial light modulator, the polarization direction of passing light is rotated by using only a magnetic layer made up of a single layer of a magneto-optic material. Thus, in this magneto-optic spatial light modulator, in order to enhance the Faraday effect to improve magneto-optic performance, it is necessary to increase the thickness of the magnetic layer.

However, the magnetic field obtained by passing a current through the conductor decreases inversely with the square of a distance from the conductor. Thus, if the thickness of the magnetic layer is increased, it is necessary to increase the value of the current to be passed through the conductor to reverse the magnetization in each pixel, and as a result, power consumption becomes high. Besides, if the thickness of the magnetic layer is increased, the reversal speed of magnetization in the pixel, that is, the operation speed of the magneto-optic spatial light modulator, is lowered.

Besides, in the conventional magneto-optic spatial light modulator, the plurality of pixels are separated from one another by, for example, grid-like grooves formed in the magnetic layer. In such a magneto-optic spatial light modulator, if the thickness of the magnetic layer is increased, it becomes necessary to increase the depths of the grooves formed in the magnetic layer as well, and therefore it becomes difficult to form the grooves. Further, if the depths of the grooves are increased, it becomes impossible to directly form the conductor on the magnetic layer. Thus, it becomes necessary that each groove is filled with an insulating material, the top surface of the magnetic layer is flattened, and then, the conductor is formed on the magnetic layer. In addition, if the depths of the grooves are increased, it becomes technically difficult to fill the grooves with the insulating material and to flatten the top surface of the magnetic layer.

SUMMARY OF THE INVENTION

An object of the present invention is to provide a spatial light modulator with an excellent magneto-optic performance, a high operation speed and low power consumption.

A spatial light modulator of the present invention comprises:

a magnetic layer that is made of a magneto-optic material and including a plurality of pixels in each of which a magnetization direction is independently set and each of which has a function of causing a rotation of a polarization direction of incident light depending on the magnetization direction by a magneto-optic effect;

a plurality of first conductor layers and a plurality of second conductor layers arranged to intersect with each other at positions corresponding to the individual pixels, through which currents for generating magnetic fields to set the magnetization directions in the individual pixels are passed; and a plurality of dielectric layers for enhancing the function of the pixels.

In the spatial light modulator of the invention, currents are passed through the first conductor layers and the second conductor layers so as to generate magnetic fields in the vicinities of the positions where these conductor layers intersect with each other. The magnetic fields thus generated determine the magnetization directions in the pixels corresponding to the positions where the first conductor layers and the second conductor layers intersect with each other. Then, the polarization direction of incident light is rotated depending on the magnetization direction of each of the pixels, and the incident light is thereby spatially modulated. Since the spatial light modulator of the invention includes a plurality of dielectric layers for enhancing the function of the pixels, it is possible to enhance the function of the pixels to cause a rotation in the polarization direction of incident light depending on the magnetization direction, while the magnetic layer is allowed to be thin.

In the spatial light modulator of the invention, the magnetic layer, the first conductor layers, the second conductor layers and the dielectric layers may constitute a one-dimensional magnetophotonic crystal.

Besides, in the spatial light modulator of the invention, the first conductor layers and the second conductor layers may be placed to sandwich the magnetic layer.

Besides, in the spatial light modulator of the invention, the first conductor layers and the second conductor layers may each include narrow portions each having a width smaller than that of another portion, and the narrow portions of the first conductor layers and the narrow portions of the second conductor layers may be arranged to overlap with each other. In this case, each of the narrow portions of the first conductor layers and each of the narrow portions of the second conductor layers may form a curved current path around a specific region in each of the pixels. Besides, the narrow portions of the first conductor layers and the narrow portions of the second conductor layers may be arranged to overlap with each other in the vicinities of peripheries of the pixels.

Besides, in the spatial light modulator of the invention, the first and conductor layers and the second conductor layers may be transparent to the incident light.

Besides, the spatial light modulator of the invention may further comprise an incidence/outgoing plane on and of which light is incident and goes out, and a reflective layer that reflects light and is provided at a side opposite to the incidence/outgoing plane with the magnetic layer interposed therebetween.

Besides, the spatial light modulator of the invention may further comprise an optical rotatory layer that is provided to be adjacent to the incidence/outgoing plane and rotates a polarization direction of passing light by a predetermined angle by the magneto-optic effect.

Besides, the spatial light modulator of the invention may further comprise a magnetic domain wall movement inhibiting portion that is provided at a boundary position between adjacent ones of the pixels and inhibits movement of a magnetic domain wall beyond the boundary position.

Besides, in the spatial light modulator of the invention, the magnetic layer may be formed of a magnetic garnet thin film.

The other objects, features, and merits of the present invention will be sufficiently clarified with the following description.

DETAILED DESCRIPTION OF THE PREFERRED EMBODIMENTS

Hereinafter, embodiments of the invention will be described in detail with reference to the drawings.

[First Embodiment]

Figure 1:
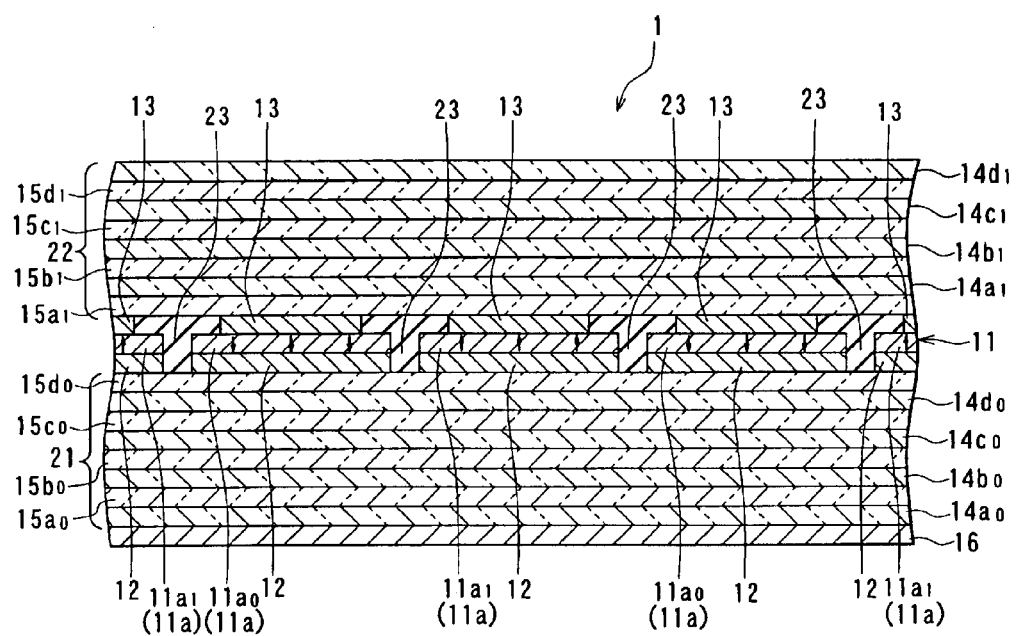
FIG. 1 is a sectional view showing an essential portion of a spatial light modulator according to a first embodiment of the invention.

First, a spatial light modulator according to a first embodiment of the invention will be described. FIG. 1 is a sectional view showing the essential portion of the spatial light modulator of this embodiment.

As shown in FIG. 1, the spatial light modulator 1 of this embodiment includes: a magnetic layer 11 made of a magneto-optic material; a plurality of lower conductor layers 12 adjacent to the bottom surface of the magnetic layer 11; and a plurality of upper conductor layers 13 adjacent to the top surface of the magnetic layer 11. Thus, the lower conductor layers 12 and the upper conductor layers 13 are placed to sandwich the magnetic layer 11. The lower conductor layers 12 correspond to the first conductor layers of the invention, and the upper conductor layers 13 correspond to the second conductor layers of the invention.

The magnetic layer 11 includes a plurality of pixels 11a in each of which a magnetization direction is independently set and each of which has a function of causing a rotation of a polarization direction of incident light depending on the magnetization direction by a magneto-optic effect (Faraday effect). As described later, the plane shape of each of the pixels 11a is rectangular. Besides, the plurality of pixels 11a are arranged to form a grid pattern.

The magnetic layer 11 is formed of, for example, a magnetic garnet thin film. As the material of the magnetic layer 11, rare earth iron garnet, bismuth-substituted rare earth iron garnet, or the like is used.

The plurality of lower conductor layers 12 extend in the same direction (hereinafter referred to as an X direction), and are arranged with constant periodicity. The plurality of upper conductor layers 13 extend in a direction (hereinafter referred to as a Y direction) orthogonal to the X direction, and are arranged with constant periodicity. The plurality of lower conductor layers 12 and the plurality of upper conductor layers 13 are arranged to intersect with each other at positions corresponding to the individual pixels 11a, and currents for generating magnetic fields for setting the magnetization directions in the individual pixels 11a are passed through the conductor layers.

The lower conductor layers 12 and the upper conductor layers 13 are transparent to incident light. The lower conductor layers 12 and the upper conductor layers 13 are formed of, for example, ITO (Indium Tin Oxide).

The spatial light modulator 1 further includes: a lower dielectric layer portion 21 provided to be adjacent to the bottom surfaces of the lower conductor layers 12; and an upper dielectric layer portion 22 provided to be adjacent to the top surfaces of the upper conductor layers 13. The lower dielectric layer portion 21 includes a first kind of dielectric layers $14a_0$, $14b_0$, $14c_0$ and $14d_0$ and a second kind of dielectric layers $15a_0$, $15b_0$, $15c_0$ and $15d_0$ alternately stacked. Among them, the dielectric layer $15d_0$ is adjacent to the bottom surfaces of the lower conductor layers 12, and the dielectric layer $14a_0$ is located most distant from the lower conductor layers 12. The upper dielectric layer portion 22 includes a first kind of dielectric layers $14a_1$, $14b_1$, $14c_1$ and $14d_1$ and a second kind of dielectric layers $15a_1$, $15b_1$, $15c_1$ and $15d_1$ alternately stacked. Among them, the dielectric layer $15a_1$ is adjacent to the top surfaces of the upper conductor layers 13, and the dielectric layer $14d_1$ is located most distant from the upper conductor layers 13.

The spatial light modulator 1 further includes a reflective layer 16 that reflects light and is provided adjacent to the bottom surface of the dielectric layer portion 21, that is, the bottom surface of the dielectric layer $14a_0$. In the spatial light modulator 1, the top surface of the dielectric layer portion 22, that is, the top surface of the dielectric layer $14d_1$, is an incidence/outgoing plane on and of which light is incident and goes out.

The plurality of dielectric layers constituting the dielectric layer portions 21 and 22 enhance the function of the pixels 11a of the magnetic layer 11, that is, the function of causing a rotation of the polarization direction of incident light depending on the magnetization direction. Specifically, the plurality of dielectric layers cooperate with the magnetic layer 11 to rotate the polarization direction of light that passes through the plurality of dielectric layers and the magnetic layer 11 by a rotation angle larger than a rotation angle of the polarization direction of light that passes through only the magnetic layer 11 once.

The first kind of dielectric layers $14a_0$, $14b_0$, $14c_0$, $14d_0$, $14a_1$ $14b_1$, $14c_1$ and $14d_1$ and the second kind of dielectric layers $15a_0$, $15b_0$, $15c_0$, $15d_0$, $15a_1$, $15b_1$, $15c_1$ and $15d_1$ have refractive indices different from each other. The first kind of dielectric layers $14a_0$ through $14d_1$ are formed of, for example, $SiO_2$. The second kind of dielectric layers $15a_0$ through $15d_1$ are formed of, for example, $Ta_2O_5$.

The plurality of dielectric layers constituting the dielectric layer portions 21 and 22, the lower conductor layers 12, the upper conductor layers 13 and the magnetic layer 11 may constitute a one-dimensional magnetophotonic crystal. The one-dimensional magnetophotonic crystal is a magneto-optic material essentially operating as a Fabry-Perot resonator. In the one-dimensional magnetophotonic crystal, by changing materials and thicknesses of the constituent layers, it is possible to design the light wavelength in which the magneto-optic effect is enhanced. Besides, the one-dimensional magnetophotonic crystal theoretically enables to attain transmittance close to 100% and a Faraday rotation angle about 100 times as large as a Faraday rotation angle of a magnetic garnet thin film of a single layer, in a wavelength range where optical absorption of a magnetic garnet thin film is negligible.

The spatial light modulator 1 further includes magnetic domain wall movement inhibiting portions 23 provided at boundary positions between adjacent ones of the pixels 11a, for inhibiting magnetic domain walls from moving beyond the boundary positions. The magnetic domain wall movement inhibiting portions 23 may be formed of, for example, grooves provided at the boundary positions between adjacent ones of the pixels 11a in the magnetic layer 11 and insulating layers provided in the grooves.

Figure 2:
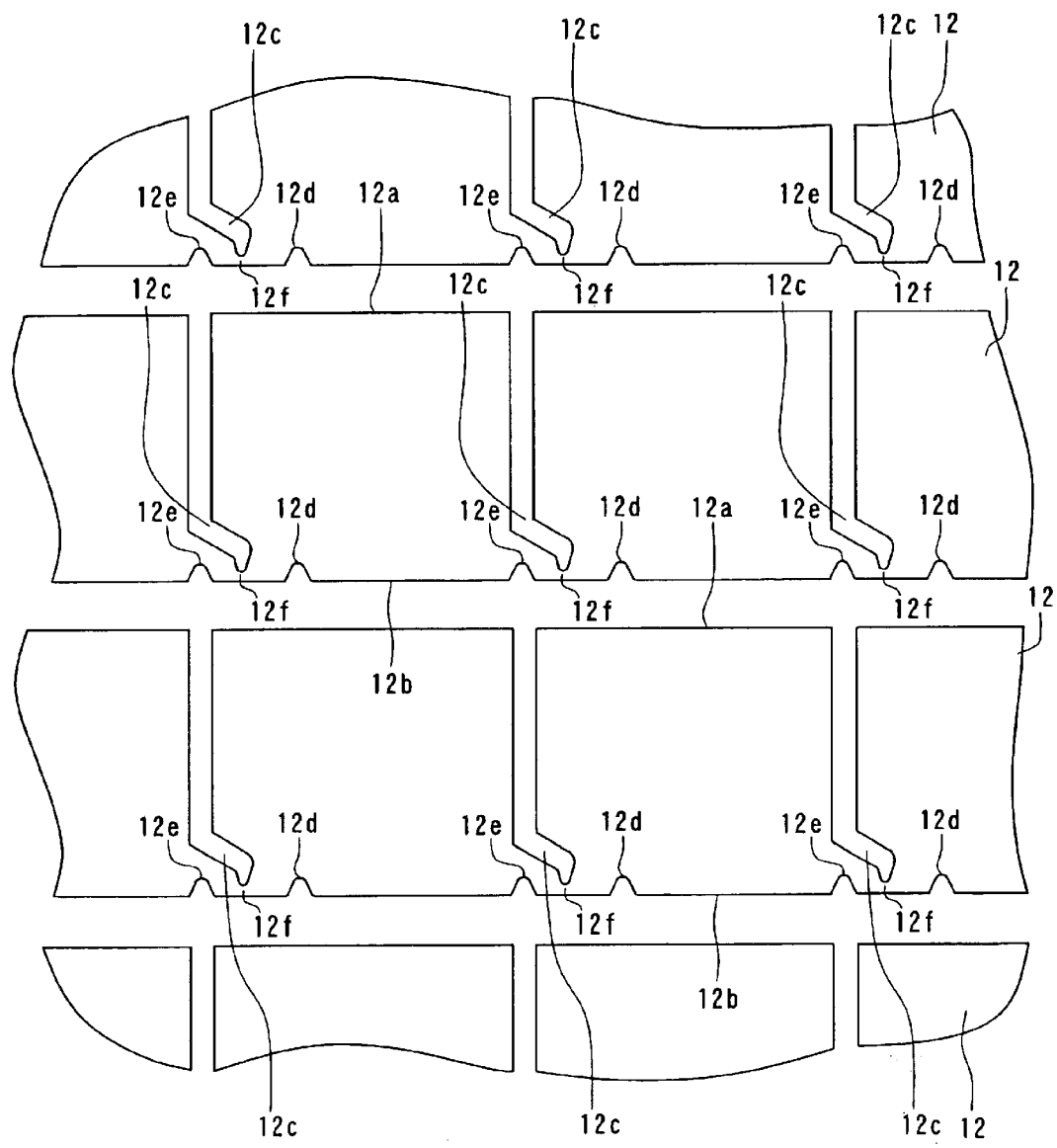
FIG. 2 is a plan view showing a part of lower conductor layers in the spatial light modulator of the first embodiment of the invention.
Figure 3:
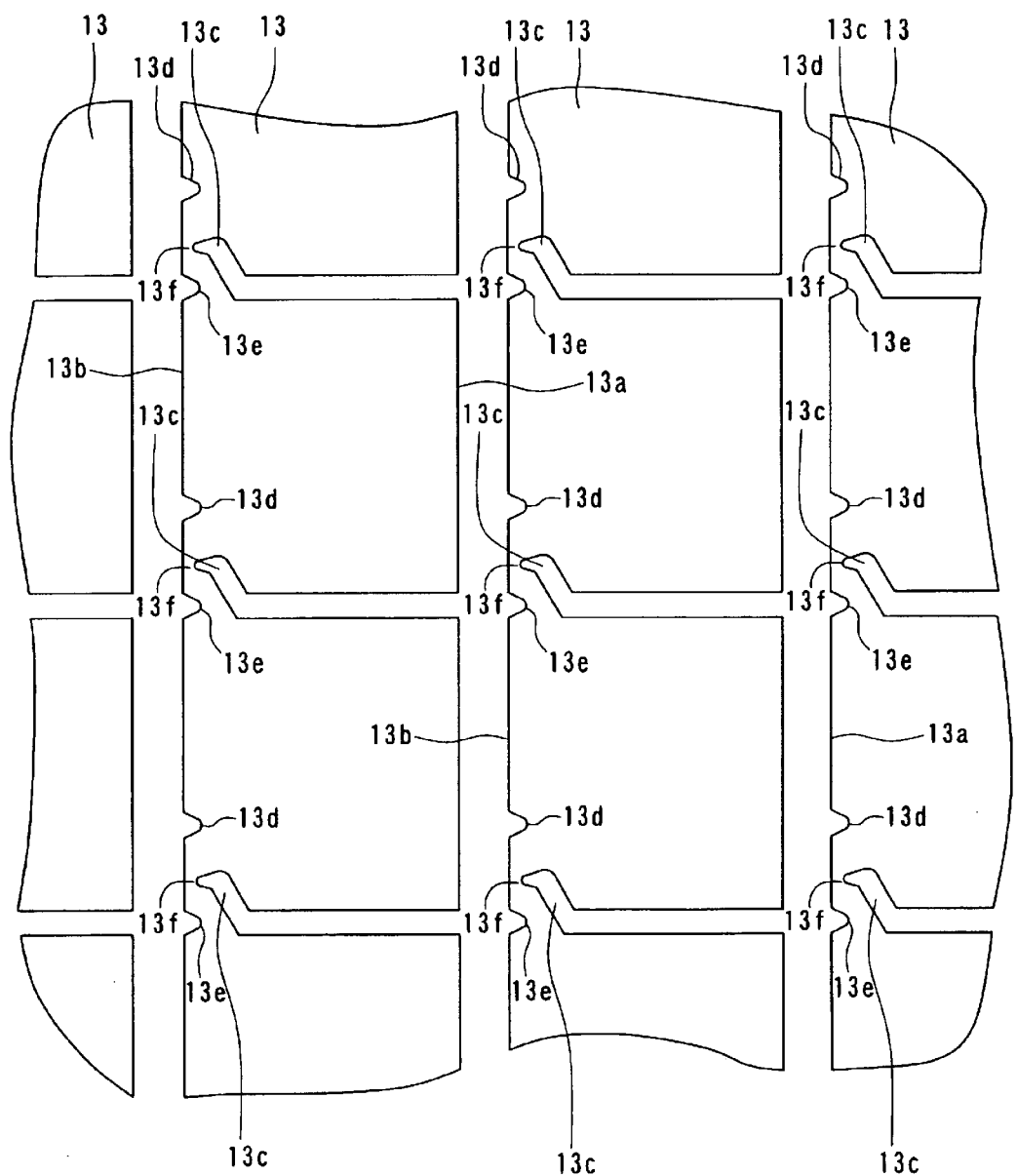
FIG. 3 is a plan view showing a part of upper conductor layers in the spatial light modulator of the first embodiment of the invention.
Figure 4:
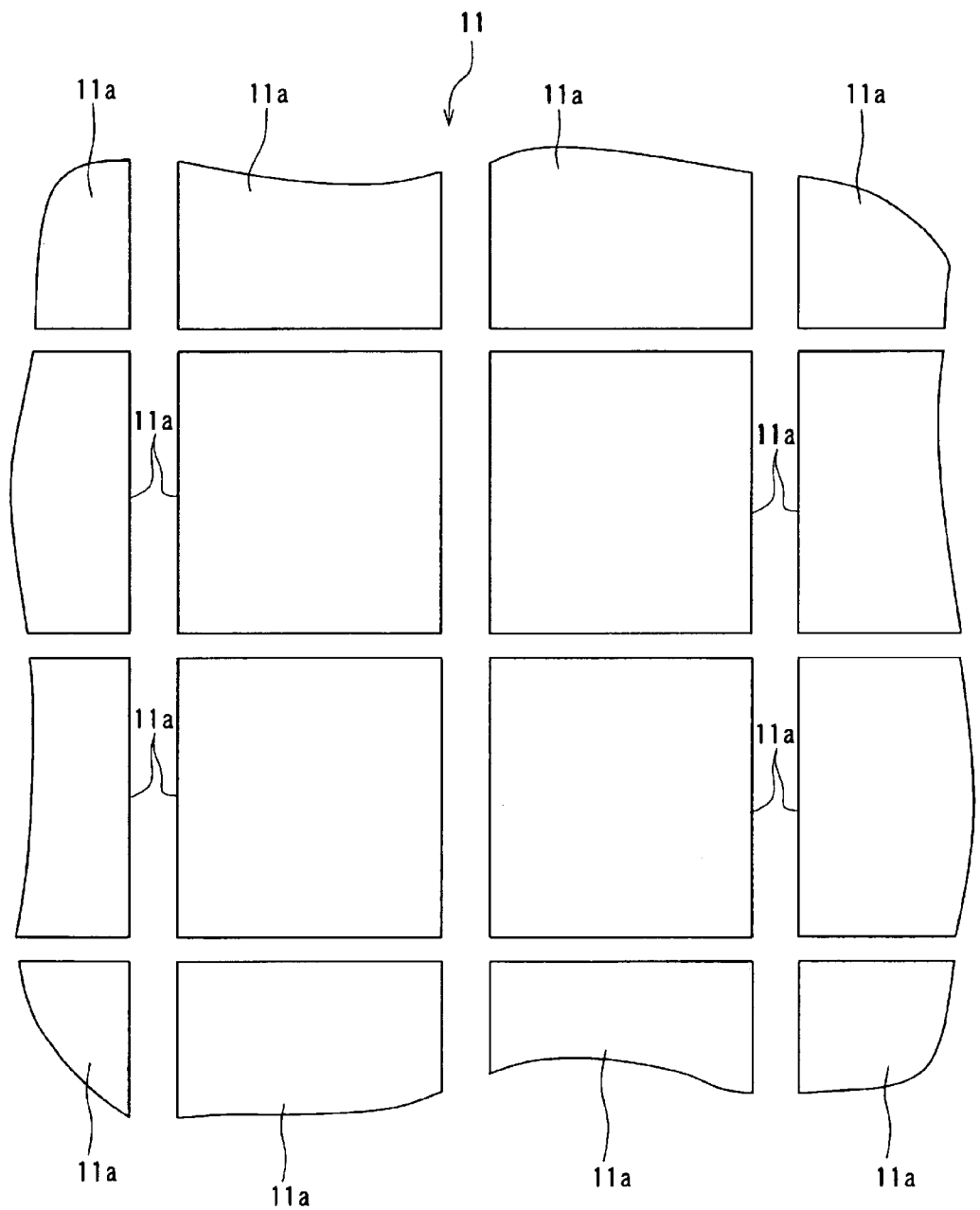
FIG. 4 is a plan view showing a part of a magnetic layer in the spatial light modulator of the first embodiment of the invention.
Figure 5:
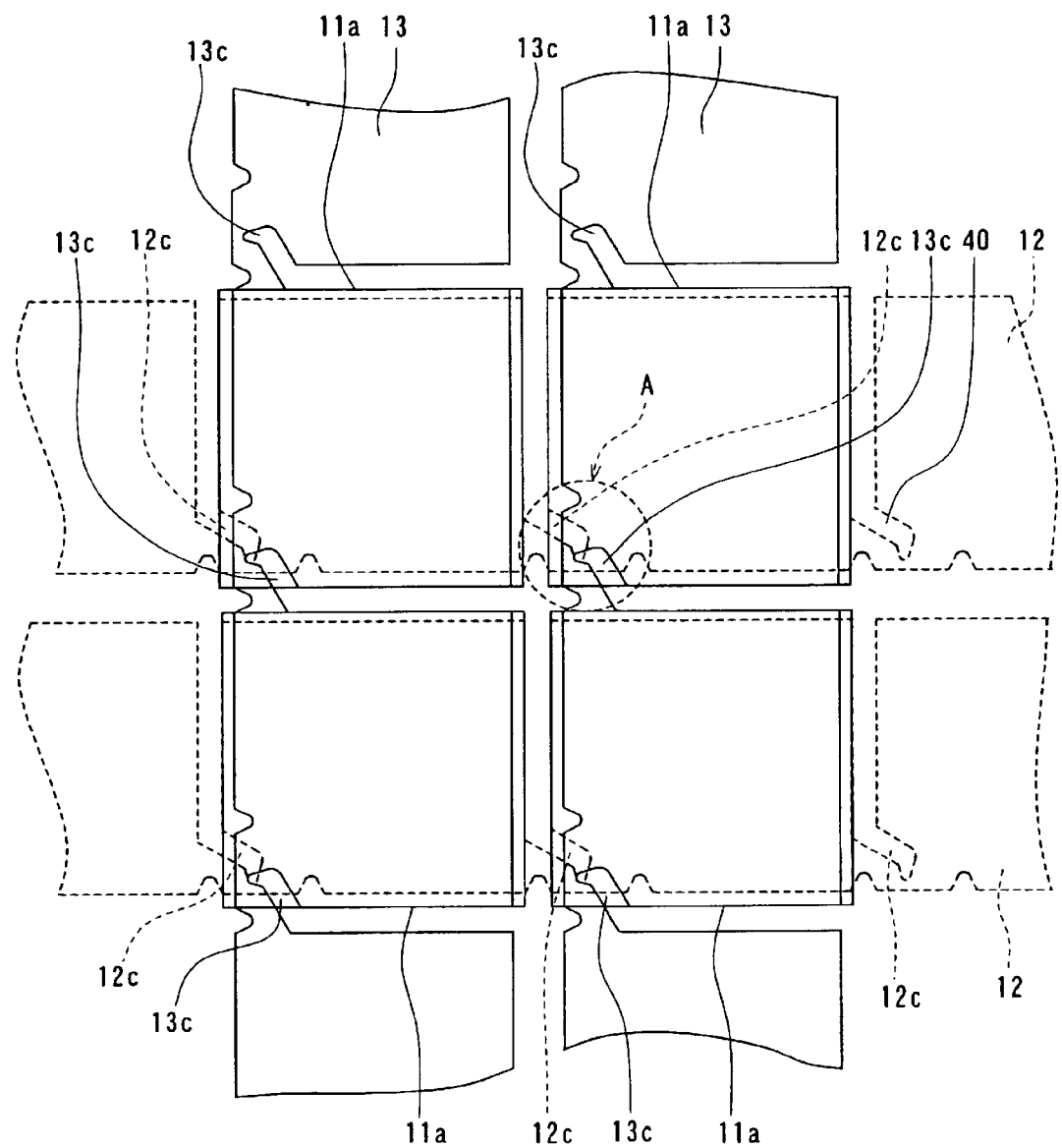
FIG. 5 is a plan view showing a positional relationship among the lower conductor layers, the upper conductor layers and the magnetic layer shown in FIGS. 2 to 4.
Figure 6:
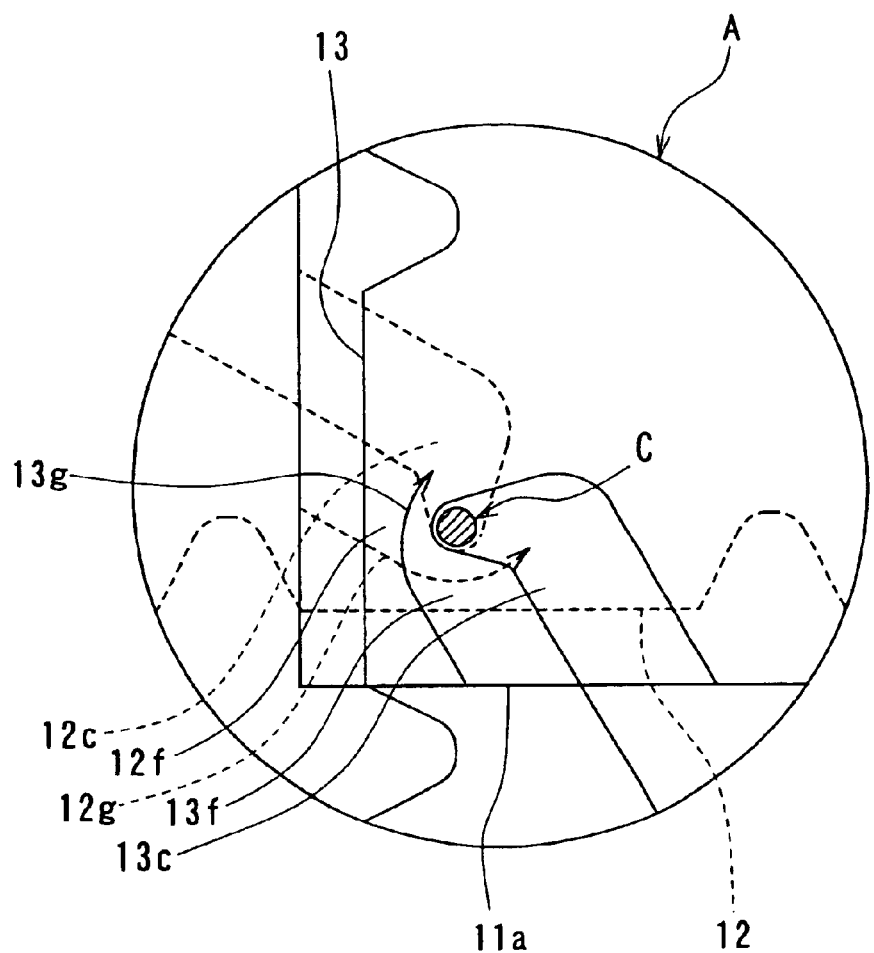
FIG. 6 is an enlarged plan view showing a part A of FIG. 5.

Next, the shapes and the arrangement of the lower conductor layers 12, the upper conductor layers 13 and the magnetic layer 11 will be described in detail with reference to FIG. 2 to FIG. 6. FIG. 2 is a plan view showing a part of the lower conductor layers 12. FIG. 3 is a plan view showing a part of the upper conductor layers 13. FIG. 4 is a plan view showing a part of the magnetic layer 11. FIG. 5 is a plan view showing a positional relationship among the lower conductor layers 12, the upper conductor layers 13 and the magnetic layer 11. FIG. 6 is an enlarged plan view showing a part A in FIG. 5.

As shown in FIG. 2, each of the lower conductor layers 12 extends in the X direction (horizontal direction in FIG. 2). The periodicity of the arrangement of the lower conductor layers 12 is coincident with the periodicity of the arrangement of the pixels 11a in the Y direction (vertical direction in FIG. 2). Besides, the positions of gaps provided between adjacent ones of the lower conductor layers 12 correspond to the positions of the boundaries between adjacent ones of the plurality of pixels 11a arranged in the Y direction. Each of the lower conductor layers 12 has an upper side 12a and a lower side 12b parallel to each other. In the lower conductor layers 12, grooves 12c are formed at positions corresponding to the positions of the boundaries between adjacent ones of the pixels 11a arranged in the X direction, the grooves each extending from the upper side 12a to the vicinity of the lower side 12b. A portion of each of the grooves 12c at a lower end side has such a shape that it is bent toward an end portion in a lower right direction, and is further bent in a lower direction. Besides, at the lower sides 12b of the lower conductor layers 12, small grooves 12d and 12e directed upward are formed at right and left outside positions of the lower ends of the grooves 12c. In each of the lower conductive layers 12, a portion between two adjacent grooves 12c corresponds to one pixel 11a. In each of the lower conductor layers 12, narrow portions 12f each having a width smaller than that of another portion are formed by the grooves 12c.

As shown in FIG. 3, each of the upper conductor layers 13 extends in the Y direction (vertical direction in FIG. 3). The periodicity of the arrangement of the upper conductor layers 13 is coincident with the periodicity of the arrangement of the pixels 11a in the X direction (horizontal direction in FIG. 3). Besides, the position of gaps provided between adjacent ones of the upper conductor layers 13 correspond to the positions of the boundaries between adjacent ones of the plurality of pixels 11a arranged in the X direction. Each of the upper conductor layers 13 has a right side 13a and a left side 13b parallel to each other. In the upper conductor layers 13, grooves 13c are formed at positions corresponding to the positions of the boundaries between adjacent ones of the plurality of pixels 11a arranged in the Y direction, the grooves each extending from the right side 13a to the vicinity of the left side 13b. A portion of each of the grooves 13c at a left end side has such a shape that it is bent toward an end portion in a left upper direction, and is further bent in a left direction. Besides, at the left sides 13b of the upper conductor layers 13, small grooves 13d and 13e directed toward the right side are formed at upper and lower outside positions of the left end portions of the grooves 13c. In each of the upper conductor layers 13, a portion between two adjacent grooves 13c corresponds to one pixel 11a. In each of the upper conductor layers 13, narrow portions 13f each having a width smaller than that of another portion are formed by the grooves 13c.

As shown in FIG. 4, the magnetic layer 11 includes the plurality of pixels 11a arranged in the X direction (horizontal direction in FIG. 4) and the Y direction (vertical direction in FIG. 4). The plane shape of each pixel is rectangular.

As shown in FIG. 6, the lower end portion of each groove 12c of the lower conductor layers 12 and the left end portion of each groove 13c of the upper conductor layers 13 are arranged to overlap with a specific small region C in the pixel 11a. The region C is located in the vicinity of a periphery of the pixel 11a, especially in the vicinity of one corner of the pixel 11a. Besides, the narrow portions 12f of the lower conductor layers 12 and the narrow portions 13f of the upper conductor layers 13 are arranged to overlap with each other in the vicinities of the regions C.

Each of the narrow portions 12f of the lower conductor layers 12 forms a curved current path 12g around the region C. The grooves 12d and 12e have a function of making the curve of the current path 12g sharp. Similarly, each of the narrow portions 13f of the upper conductor layers 13 forms a curved current path 13g around the region C. The grooves 13d and 13e have a function of making the curve of the current path 13g sharp.

Next, the operation of the spatial light modulator 1 according to this embodiment will be described. According to the spatial light modulator 1 of this embodiment, a positive or a negative pulse current is supplied to any one of the lower conductor layers 12 and any one of the upper conductor layers 13 in accordance with modulation information. A magnetic field is thereby generated in the vicinity of the position where the ones of the conductor layers 12 and 13 intersect with each other. Depending on whether the pulse current is positive or negative, the directions of magnetic fields to be generated are opposite to each other. The magnetic field thus generated is applied to the pixel 11a corresponding to the position where the ones of the conductor layers 12 and 13 intersect with each other. In the pixel 11a, when a magnetic field in a direction opposite to the existing direction of magnetization is applied, a nucleus of a magnetic domain of magnetization in the same direction as the applied magnetic field is produced, and then, this magnetic domain is enlarged. The enlargement of the magnetic domain is stopped when the magnetic domain wall reaches the magnetic domain wall movement inhibiting portion 23. As a result, one pixel 11a as a whole has magnetization having the same direction as the applied magnetic field. In this way, by supplying a positive or negative pulse current to any one of the conductor layers 12 and any one of the conductor layers 13, the magnetization direction in each pixel 11a is independently set.

In FIG. 1, the number $11a_0$ indicates a pixel in which the magnetization is directed downward (hereinafter also referred to as an off-pixel), and $11a_1$ indicates a pixel in which the magnetization is directed upward (hereinafter also referred to as an on-pixel).

Light incident on the incidence/outgoing plane, that is, the top surface of the upper dielectric layer portion 22 of the spatial light modulator 1, passes through the upper dielectric layer portion 22, the upper conductor layers 13, the pixels 11a, the lower conductor layers 12 and the lower dielectric layer portion 21, to reach the reflective layer 16. At that time, the polarization direction of the light is rotated depending on the magnetization direction of each pixel 11a in accordance with the Faraday effect. For example, if the polarization direction of the light passing through the on-pixel $11a_1$ having the upward magnetization is rotated by $+\theta_F$, the polarization direction of the light passing through the off-pixel $11a_0$ having the downward magnetization is rotated by $-\theta_F$.

The light that has reached the reflective layer 16 is reflected by the reflective layer 16, and again passes through the lower dielectric layer portion 21, the lower conductor layers 12, the pixels 11a, the upper conductor layers, 13 and the upper dielectric layer portion 22, and goes out of the incidence/outgoing plane of the spatial light modulator 1, to become outgoing light. Like that of the light incident on the incidence/outgoing plane and reaching the reflective layer 16, the polarization direction of the light reflected by the reflective layer 16 and going out of the incidence/outgoing plane is rotated depending on the magnetization direction of each pixel 11a in accordance with the Faraday effect. As described above, when light is incident on the incidence/outgoing plane and reaches the reflective layer 16, if the polarization direction of the light passing through the on-pixel $11a_1$ is rotated by $+\theta_F$ and the polarization direction of the light passing through the off-pixel $11a_0$ is rotated by $-\theta_F$, then, during the period from the incidence of the light on the incidence/outgoing plane to the outgoing from the incidence/outgoing plane, the polarization direction of the light passing through the on-pixel $11a_1$ is rotated by $+2\theta_F$ and the polarization direction of the light passing through the off-pixel $11a_0$ is rotated by $-2\theta_F$. In this way, outgoing light whose polarization direction is spatially modulated is produced.

Features of the shapes of the lower conductor layers 12 and the upper conductor layers 13 in this embodiment will now be described. In this embodiment, the narrow portions 12f of the lower conductor layers 12 and the narrow portions 13f of the upper conductor layers 13 are arranged to overlap with each other in the vicinities of the regions C. In the narrow portions 12f and 13f, current density becomes high as compared with other portions of the lower conductor layers 12 and the upper conductor layers 13. Therefore, a locally high magnetic field can be produced in the vicinities of the positions where the narrow portions 12f and 13f overlap with each other.

Besides, in this embodiment, each of the narrow portions 12f and each of the narrow portions 13f form the curved current paths 12g and 13g, respectively, around the specific region C in each pixel 11a. Currents flowing through the current paths 12g and 13g produce magnetic fields passing through the region C. Therefore, according to this embodiment, it is possible to apply a high magnetic field to the specific region C in each pixel 11a.

Here, advantages of the shapes of the lower conductor layers 12 and the upper conductor layers 13 in this embodiment will be described with reference to the results of three-dimensional electromagnetic field analysis on the basis of a finite element method. First, for comparison with this embodiment, the results of the three-dimensional electromagnetic field analysis with respect to a conductor layer 111 shown in FIG. 7 will be described. The conductor layer 111 shown in FIG. 7 includes a narrow portion 111a having a width smaller than another portion. However, a current path 111b formed by this narrow portion 111a is linear. The thickness of the conductor layer 111 is 0.2 $\mu$m. The width of the narrow portion 111a is 1.6 $\mu$m.

Figure 7:
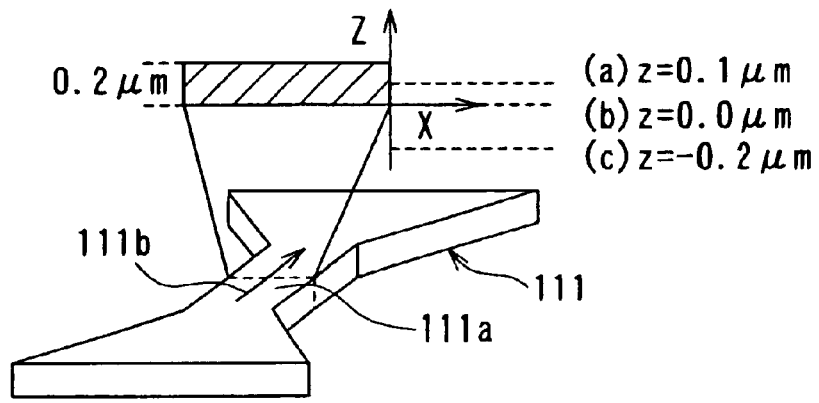
FIG. 7 is an explanatory view showing the shape of a conductor layer for analysis provided for comparison with the conductor layer in the first embodiment of the invention.

The three-dimensional electromagnetic field analysis was carried out with respect to the conductor layer 111 shown in FIG. 7. In this analysis, a relation between a distance X ($\mu$m) from one end face of the narrow portion 111a in the width direction and magnetic field intensity $H_z$(Oe=×79 A/m) in the thickness direction (Z direction) of the conductor layer 111 was obtained with respect to three positions (a), (b) and (c) in the thickness direction (Z direction) of the conductor layer 111. In this analysis, a current flowing through the conductor layer 111 was made 100 mA. Assuming the position of the bottom surface of the conductor layer 111 to be the origin, a position in the Z direction was expressed by a coordinate z which had a positive value at the upper side of the origin and a negative value at the lower side thereof. The position (a) is a position of Z=0.1 $\mu$m, that is, the center position of the conductor layer 111 in the thickness direction. The position (b) is a position of z=0.0 $\mu$m, that is, the position of the bottom surface of the conductor layer 111. The position (c) is a position of z=−0.2 $\mu$m, that is, a position 0.2 $\mu$m distant from the bottom surface of the conductor layer 111 downward.

Figure 8:
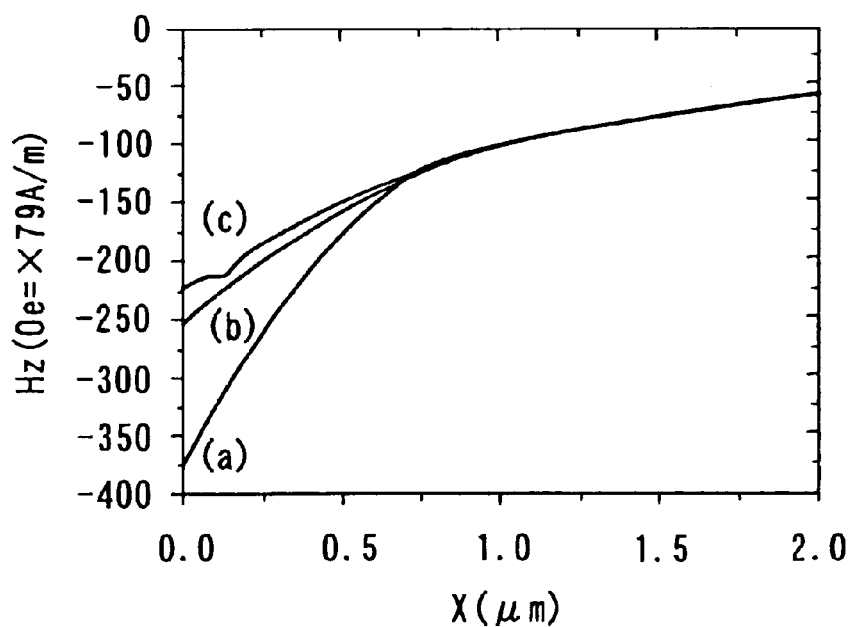
FIG. 8 is a characteristic view showing the results of three-dimensional electromagnetic analysis with respect to the conductor layer shown in FIG. 7.

The results of the analysis are shown in FIG. 8. It is apparent from FIG. 8 that, when the conductor layer 111 shown in FIG. 7 is used, the absolute value of the magnetic field intensity $H_z$ abruptly decreases as the distance from the one end face of the narrow portion 111a in the width direction increases. The results of the above analysis showed that a magnetic field whose absolute value is a maximum value of 375 Oe was generated at the position of z=0.1 $\mu$m and X=0.0 $\mu$m. In order to effectively use this magnetic field for reversal of magnetization in the magnetic layer, it is necessary to embed the conductor layer 111 in the magnetic layer.

Next, the results of the three-dimensional electromagnetic field analysis with respect to a conductor layer 121 shown in FIG. 9 will be described. The conductor layer 121 shown in FIG. 9 corresponds to the lower conductor layer 12 and the upper conductor layer 13 of this embodiment. The conductor layer 121 includes grooves 121c, 121d and 121e similar to the grooves 13c, 13d and 13e in the conductor layer 13. Besides, the conductor layer 121 includes a narrow portion 121f similar to the narrow portion 13f in the conductor layer 13. A current path 121g formed by this narrow portion 121f is curved. The thickness of the conductor layer 121 is 0.2 $\mu$m. The minimum value of the width of the narrow portion 121f is 1.6 $\mu$m.

Figure 9:
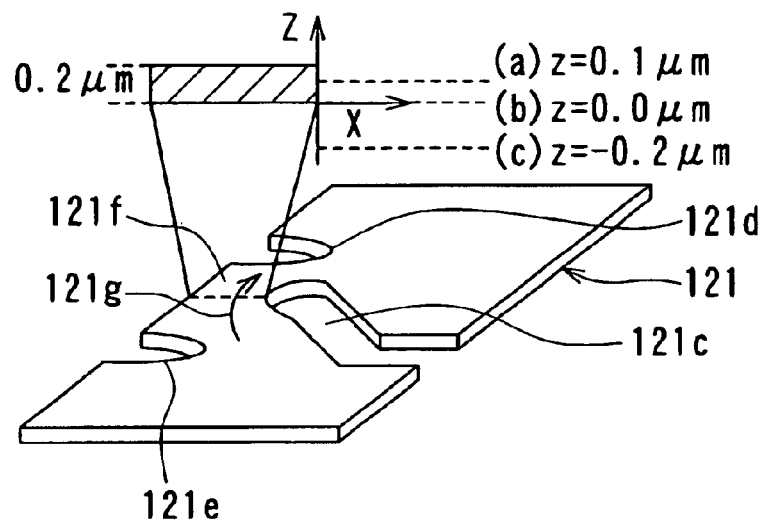
FIG. 9 is an explanatory view showing the shape of a conductor layer for analysis that corresponds to the conductor layer in the first embodiment of the invention.

The three-dimensional electromagnetic field analysis was carried out with respect to the conductor layer 121 shown in FIG. 9. In this analysis, a relation between a distance X ($\mu$m) from one end face of the narrow portion 121f in the width direction and magnetic field intensity $H_z$(Oe=×79 A/m) in the thickness direction (Z direction) of the conductor layer 121 was obtained with respect to three positions (a), (b) and (c) in the thickness direction (Z direction) of the conductor layer 121. In this analysis, a current flowing through the conductor layer 121 was made 100 mA. Assuming the position of the bottom surface of the conductor layer 121 to be the origin, a position in the Z direction was expressed by a coordinate z which had a positive value at the upper side of the origin and a negative value at the lower side thereof. The position (a) is a position of Z=0.1 $\mu$m, that is, the center position of the conductor layer 121 in the thickness direction. The position (b) is a position of z=0.0 $\mu$m, that is, the position of the bottom surface of the conductor layer 121. The position (c) is a position of z=−0.2 $\mu$m, that is, a position 0.2 $\mu$m distant from the lower surface of the conductor layer 121 downward.

Figure 10:
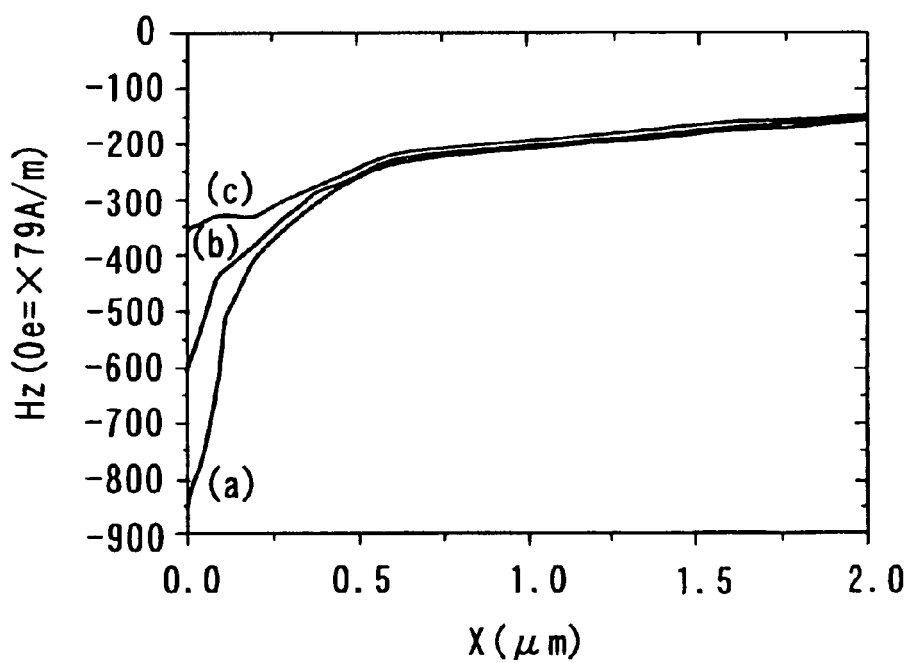
FIG. 10 is a characteristic view showing the results of three-dimensional electromagnetic analysis with respect to the conductor layer shown in FIG. 9.

The results of the above analysis is shown in FIG. 10. When the absolute values of the magnetic field intensity $H_z$ in FIGS. 10 and 8 are compared with each other at the position of X=0.0 $\mu$m, the following is shown. That is, at the position of z=0.1 $\mu$m, when the conductor layer 121 shown in FIG. 9 is used, a magnetic field is produced whose absolute value is 860 Oe, which is approximately twice as large as that of a magnetic field generated using the conductor layer 111 shown in FIG. 7. Besides, when the conductor layer 121 shown in FIG. 9 is used, a great magnetic field having an absolute value of 300 to 400 Oe is also generated at the position of z=0.0 $\mu$m and X=0.0 $\mu$m, and the position of z=−0.2 $\mu$m and X=0.0 $\mu$m. This indicates that, if the conductor layer 121 shown in FIG. 9 is used, it is possible to apply a high magnetic field to the magnetic layer even if the conductor layer 121 is not embedded in the magnetic layer.

Figure 11:
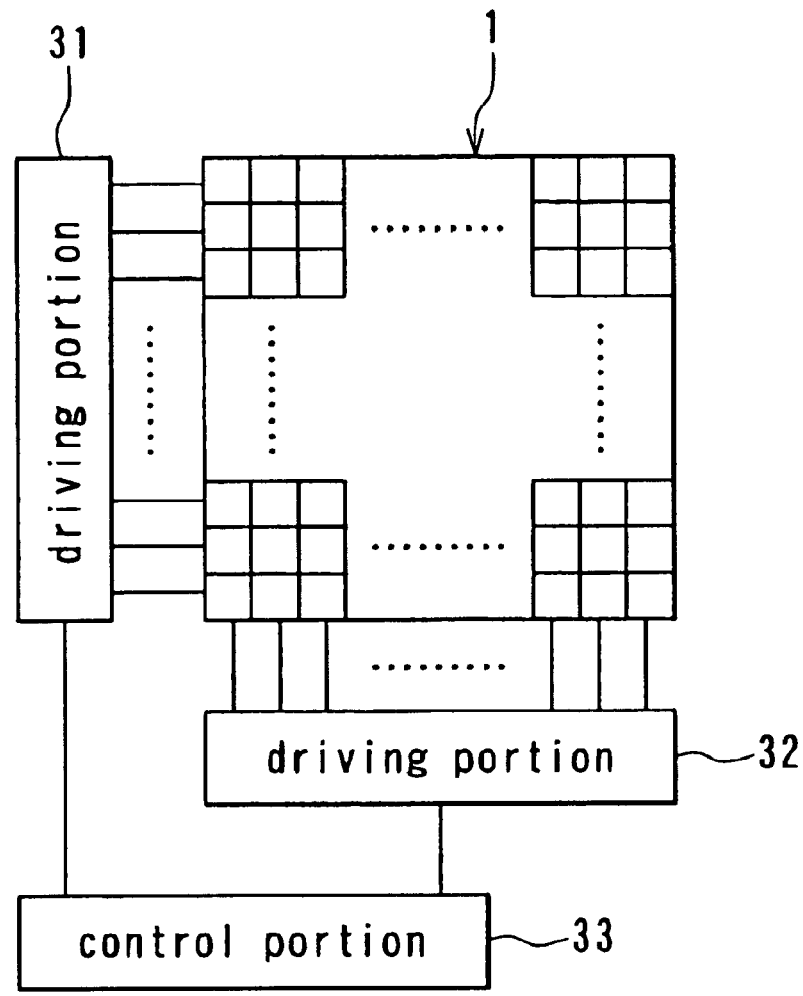
FIG. 11 is a block diagram showing the spatial light modulator of the first embodiment of the invention and its peripheral circuits.

Next, driving means of the spatial light modulator 1 of this embodiment will be described with reference to FIG. 11. FIG. 11 is a block diagram showing the spatial light modulator 1 and its peripheral circuits. As shown in FIG. 11, the lower conductor layers 12 of the spatial light modulator 1 are connected to a driving portion 31, and the upper conductor layers 13 are connected to a driving portion 32. The driving portions 31 and 32 are controlled by a control portion 33. Under control of the control portion 33, the driving portions 31 and 32 supply positive or negative pulse currents to the lower conductor layers 12 and the upper conductor layers 13, respectively. The driving portion 31 includes a plurality of driving circuits for supplying the positive or negative pulse currents to the plurality of lower conductor layers 12. Similarly, the driving portion 32 includes a plurality of driving circuits for supplying the positive or negative pulse currents to the plurality of upper conductor layers 13.

Figure 12:
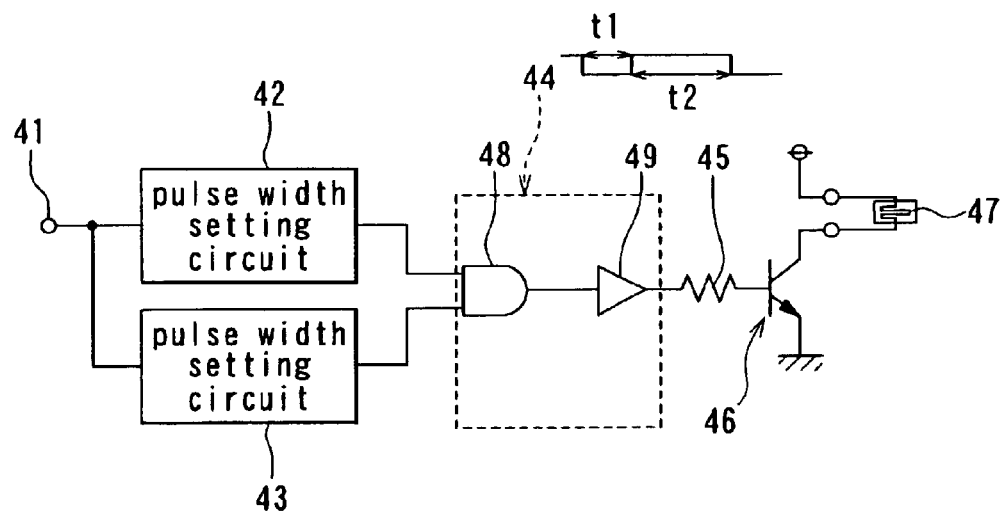
FIG. 12 is a circuit diagram showing an example of a configuration of a driving circuit included in a driving portion in FIG. 11.

FIG. 12 is a circuit diagram showing an example of the configuration of the driving circuit included in the driving portions 31 and 32. This driving circuit includes: a control signal input end 41; two pulse width setting circuits 42 and 43 an input end of each of which is connected to the control signal input end 41; a pulse generating circuit 44 for generating a driving pulse by receiving output of each of the pulse width setting circuits 42 and 43; a resistor 45 one end of which is connected to an output end of the pulse generating circuit 44; and a transistor 46 the base of which is connected to the other end of the resistor 45. The emitter of the transistor 46 is grounded. The collector of the transistor 46 is connected to one end of one conductor layer 47 (the lower conductor layer 12 or the upper conductor layer 13). A predetermined power supply voltage is applied to the other end of the conductor layer 47. A control signal from the control portion 33 is inputted to the control signal input end 41.

The pulse generating circuit 44 includes an AND gate 48 for receiving output of each of the pulse width setting circuits 42 and 43, and an operational amplifier 49 for outputting a driving pulse by receiving output of the AND gate 48. The driving pulse is applied to the base of the transistor 46 through the resistor 45.

The pulse width setting circuit 42 sets a time t1 of a low level of the output of the pulse generating circuit 44. The pulse width setting circuit 43 sets a time t2 of a high level of the output of the pulse generating circuit 44.

In the driving circuit shown in FIG. 12, when the control signal from the control portion 33 is inputted to the control signal input end 41, the pulse width setting circuits 42 and 43 output pulses for specifying the times t1 and t2, respectively. The pulse generating circuit 44 generates the driving pulse on the basis of the output pulses of the pulse width setting circuits 42 and 43. The transistor 46 operates in response to this driving pulse, and the pulse current flows through the conductor layer 47 in response to the operation of the transistor 46.

Next, an example of a method of use and an operation of the spatial light modulator 1 of this embodiment will be described with reference to FIG. 13. In this example, a rotation angle $+2\theta_F$ of the polarization direction of light which is incident on the spatial light modulator 1, passes through the on-pixel $11a_1$ and goes out of the spatial light modulator 1 is assumed to be 90°. Further, in this example, a rotation angle $-2\theta_F$ of the polarization direction of light which is incident on the spatial light modulator 1, passes through the off-pixel $11a_0$ and goes out of the spatial light modulator 1 is assumed to be −90°.

Figure 13:
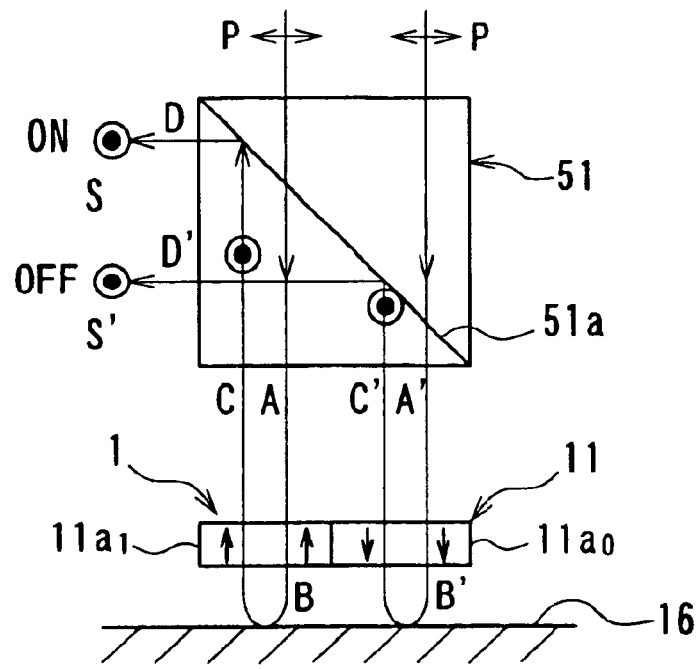
FIG. 13 is an explanatory view for explaining an example of a method of use and an operation of the spatial light modulator of the first embodiment of the invention.

In the example shown in FIG. 13, a polarizing beam splitter 51 is provided at a light incident side of the spatial light modulator 1. The polarizing beam splitter 51 has a polarizing beam splitter plane 51a inclined at 45° with respect to the incidence/outgoing plane of the spatial light modulator 1. The polarizing beam splitter plane 51a permits P-polarized light to pass therethrough and reflects S-polarized light. The P-polarized light is linearly polarized light whose polarization direction is parallel to the incidence plane (surface of the drawing sheet of FIG. 13), and the S-polarized light is linearly polarized light whose polarization direction is perpendicular to the incidence plane.

In the example shown in FIG. 13, the P-polarized light is incident on the polarizing beam splitter 51 in the direction vertical to the incidence/outgoing plane of the spatial light modulator 1. This light passes through the polarizing beam splitter plane 51a, is incident on the spatial light modulator 1, passes through the magnetic layer 11, is reflected by the reflective layer 16, again passes through the magnetic layer 11, and returns to the polarizing beam splitter 51. In this example, the polarization direction of the light passing through the on-pixel $11a_1$ is rotated by 90° and becomes S-polarized light, whereas the polarization direction of the light passing through the off-pixel $11a_0$ is rotated by −90° and becomes S-polarized light. Accordingly, all the return light from the spatial light modulator 1 is reflected by the polarizing beam splitter plane 51a, and goes out of the polarizing beam splitter 51. In FIG. 13, the path of the light passing through the on-pixel $11a_1$ (expressed by character ON) is indicated with characters A to D. Besides, the path of the light passing through the off-pixel $11a_0$ (expressed by character OFF) is indicated with characters A' to D'.

In the example shown in FIG. 13, although all the return light from the spatial light modulator 1 is S-polarized light, the phase of the light passing through the on-pixel $11a_1$ is different from the phase of the light passing through the off-pixel $11a_0$ by 180°. Accordingly, the spatial light modulator 1 in this example is a phase spatial light modulator for spatially modulating the phase of light.

As described above, since the spatial light modulator 1 of this embodiment includes the plurality of dielectric layers for enhancing the function of the pixels 11a, it is possible to enhance the function of the pixels 11a to cause a rotation of the polarization direction of incident light depending on the magnetization direction, while the magnetic layer 11 is allowed to be thin. Therefore, according to the spatial light modulator 1 of the invention, it is possible to achieve improved magneto-optic performance, a high operation speed and low power consumption.

Besides, in this embodiment, the lower conductor layers 12 and the upper conductor layers 13 are placed to sandwich the magnetic layer 11. Therefore, according to this embodiment it is possible to apply a high magnetic field to the magnetic layer 11.

Besides, in this embodiment, each of the lower conductor layers 12 includes the narrow portions 12f, and each of the upper conductor layers 13 includes the narrow portions 13f, the narrow portions each having a width smaller than that of another portion. The narrow portions 12f and 13f are arranged to overlap with each other. Therefore, according to this embodiment it is possible to generate high magnetic fields in the vicinities of the positions where the narrow portions 12f and 13f overlap with each other.

Besides, in this embodiment, the narrow portions 12f and 13f respectively form the curved current paths 12g and 13g around the specific regions C in the pixels 11a. Therefore, according to this embodiment it is possible to apply high magnetic fields to the specific regions C in the pixels 11a.

Besides, in this embodiment, the narrow portions 12f and 13f are arranged to overlap with each other in the vicinities of the peripheries of the pixels 11a. Therefore, according to this embodiment it is possible to reduce an influence exerted by the shapes of the lower conductor layers 12 and the upper conductor layers 13 on the light modulated by the spatial light modulator 1.

Since the spatial light modulator 1 of this embodiment has a simple structure with no mechanical driving portion and does not include a fluid such as a liquid crystal, the reliability is high. Besides, the spatial light modulator 1 of this embodiment enables to reduce the manufacturing cost because it has the simple structure and can be mass-produced by using a semiconductor manufacturing process.

Besides, in the spatial light modulator 1 of this embodiment, the state of magnetization in each pixel 11a of the magnetic layer 11 is maintained unless a magnetic field to reverse magnetization is applied to each pixel 11a. Therefore, modulation information can be kept by the spatial light modulator 1.

Besides, since the components making up the spatial light modulator 1 of this embodiment have high resistance to ultraviolet rays and cosmic rays, the spatial light modulator 1 is utilizable in a wide range of fields, including a use in space and so on.

[Second Embodiment]

Figure 14:
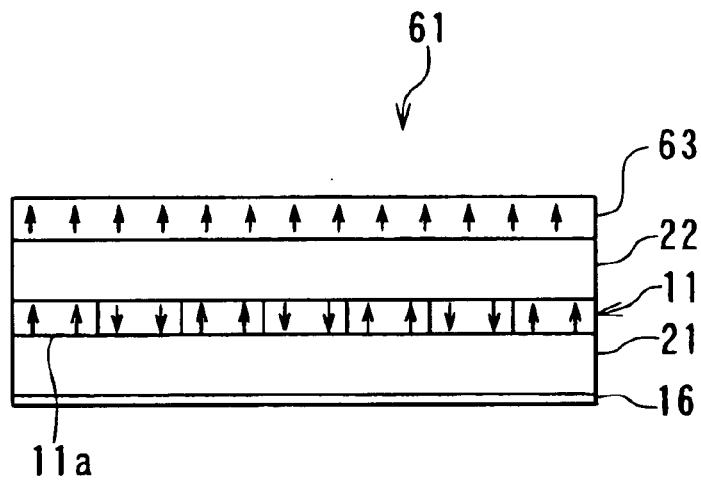
FIG. 14 is an explanatory view showing a schematic configuration of a spatial light modulator of a second embodiment of the invention.

A spatial light modulator according to a second embodiment of the invention will now be described. FIG. 14 is an explanatory view showing a schematic configuration of the spatial light modulator of this embodiment. As shown in FIG. 14, the spatial light modulator 61 of this embodiment includes an optical rotatory layer 63 provided to be adjacent to the top surface of the upper dielectric layer portion 22, in addition to the components of the spatial light modulator 1 of the first embodiment. The optical rotatory layer 63 includes a layer formed of a magneto-optic material. The optical rotatory layer 63 may be made of a one-dimensional magnetophotonic crystal.

The whole magnetization in the optical rotatory layer 63 is set to have the same direction, for example, an upward direction in FIG. 14. The optical rotatory layer 63 rotates the polarization direction of passing light by a predetermined angle by the magneto-optic effect (Faraday effect).

The remainder of the configuration of the spatial light modulator 61 of this embodiment is the same as that of the spatial light modulator 1 of the first embodiment.

Next, an example of a method of use and an operation of the spatial light modulator 61 of this embodiment will be described with reference to FIG. 15. In this example, a rotation angle $+2\theta_F$ of the polarization direction of light which is incident on the spatial light modulator 61, passes through the on-pixel $11a_1$ and goes out of the spatial light modulator 61 is assumed to be 45°. Further, in this example a rotation angle $-2\theta_F$ of the polarization direction of light which is incident on the spatial light modulator 61, passes through the off-pixel $11a_0$ and goes out of the spatial light modulator 61 is assumed to be −45°. Besides, in this example, the optical rotatory layer 63 is assumed to rotate the polarization direction of passing light by 22.5° at one passing, and therefore by 45° through forward and backward passing of the light.

Figure 15:
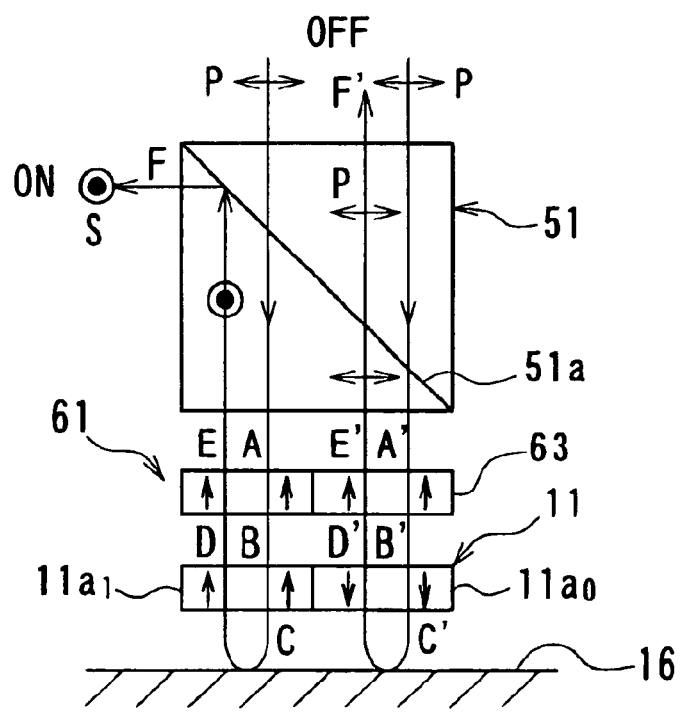
FIG. 15 is an explanatory view for explaining an example of a method of use and an operation of the spatial light modulator of the second embodiment of the invention.

In the example shown in FIG. 15, a polarizing beam splitter 51 is provided at a light incident side of the spatial light modulator 61. The polarizing beam splitter 51 includes a polarizing beam splitter plane 51a inclined at 45° with respect to the incidence/outgoing plane of the spatial light modulator 61. The polarizing beam splitter plane 51a permits P-polarized light to pass therethrough and reflects S-polarized light.

In the example shown in FIG. 15, P-polarized light is incident on the polarizing beam splitter 51 in the direction vertical to the incidence/outgoing plane of the spatial light modulator 61. This light passes through the polarizing beam splitter plane 51a, is incident on the spatial light modulator 61, passes through the optical rotatory layer 63 and the magnetic layer 11 successively, is reflected by the reflective layer 16, again passes through the magnetic layer 11 and the optical rotatory layer 63, and returns to the polarizing beam splitter 51.

In this example, the polarization direction of the light passing through the on-pixel $11a_1$ is rotated by 45° as a result of passing through the optical rotatory layer 63 twice, that is, passing forward and backward, and further by 45° as a result of passing through the magnetic layer 11 twice, that is, passing forward and backward. Consequently, the polarization direction is rotated by a total of 90° and the light becomes S-polarized light. Therefore, the light that has passed through the on-pixel $11a_1$ is reflected by the polarizing beam splitter plane 51a and goes out of the polarizing beam splitter 51.

On the other hand, the polarization direction of the light passing through the off-pixel $11a_0$ is rotated by 45° as a result of passing through the optical rotatory layer 63 twice, that is, passing forward and backward, and by −45° as a result of passing through the magnetic layer 11 twice, that is, passing forward and backward. Consequently, the light returns to P-polarized light. Therefore, the light that has passed through the off-pixel $11a_0$ passes through the polarizing beam splitter plane 51a and goes out of the polarizing beam splitter 51.

In FIG. 15, the path of the light passing through the on-pixel $11a_1$ (expressed by character ON) is indicated with characters A to F. The path of the light passing through the off-pixel $11a_0$ (expressed by character OFF) is indicated with characters A' to F'.

In the example shown in FIG. 15, the return light from the spatial light modulator 61 is separated by the polarizing beam splitter 51 into the light passing through the on-pixel $11a$ and the light passing through the off-pixel $11a_0$. The two kinds of outgoing light separated by the polarizing beam splitter 51 each become light whose light intensity is spatially modulated.

Since the spatial light modulator 61 of this embodiment includes the optical rotatory layer 63 which rotates the polarization direction of passing light by a predetermined angle, the polarization direction of the light going out of the spatial light modulator 61 may be set in a desired direction. This makes it possible, as in the example shown in FIG. 15, to separate two kinds of light having different polarization directions from each other easily and at a high optical extinction ratio.

Besides, in the spatial light modulator 61 of this embodiment, a rotation angle of the polarization direction in the optical rotatory layer 63 can be adjusted by adjusting the thickness of the optical rotatory layer 63. This makes it possible to adjust the optical extinction ratio to become maximum by, for example, forming the optical rotatory layer 63 having a predetermined thickness and thereafter adjusting its thickness by polishing the optical rotatory layer 63.

In this embodiment, the optical rotatory layer 63 may include a plurality of kinds of regions each corresponding to each of the pixels $11a$ of the magnetic layer 11 and having different rotation angles of the polarization direction. The plurality of kinds of regions may be arranged in accordance with a predetermined pattern.

FIG. 15 shows an example of the configuration of the spatial light modulator 61 in the case where the optical rotatory layer 63 includes a plurality of kinds of regions in which rotation angles of the polarization direction are different. In this example, the optical rotatory layer 63 includes a plurality of regions each corresponding to each of the pixels $11a$ of the magnetic layer 11. These regions include two kinds of regions, one of which is those having an upward magnetization direction, and the other of which is those having a downward magnetization direction. The regions having the upward magnetization direction rotate the polarization direction of passing light by 22.5° at one passing, and rotate it by 45° through forward and backward passing. On the other hand, the regions having the downward magnetization direction rotate the polarization direction of passing light by −22.5° at one passing, and rotate it by −45° through forward and backward passing. The two kinds of regions are arranged in a predetermined pattern such as a mosaic shape. Information on the arrangement pattern of the two kinds of regions is stored in the driving portions 31 and 32 or the control portion 33 in FIG. 11.

Figure 16:
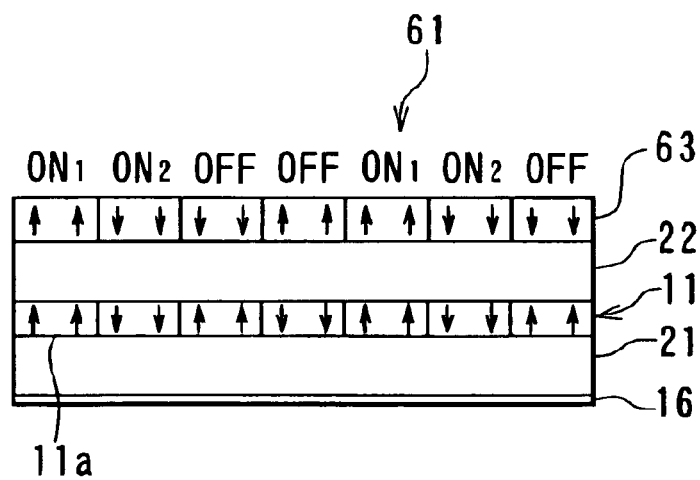
FIG. 16 is an explanatory view showing an example of a configuration of a spatial light modulator wherein an optical rotatory layer includes a plurality of kinds of regions in the second embodiment of the invention.

Besides, in the example shown in FIG. 16, each pixel $11a$ of the magnetic layer 11 rotates the polarization direction of passing light by 45° through forward and backward passing when the magnetization direction is upward, and rotates the polarization direction of passing light by −45° through forward and backward passing when the magnetization direction is downward.

Here, on the assumption that P-polarized light is incident on the spatial light modulator 61 shown in FIG. 15, the operation of the spatial light modulator 61 will now be described. In the spatial light modulator 61 shown in FIG. 16, the polarization direction of light which has passed through the region of the optical rotatory layer 63 where the magnetization direction is upward and through the pixel $11a$ of the magnetic layer 11 where the magnetization direction is upward is rotated by 90°, and the light becomes S-polarized light. Hereinafter, this light is referred to as a first on-light $ON_1$. Besides, in the spatial light modulator 61 shown in FIG. 16, the polarization direction of light which has passed through the region of the optical rotatory layer 63 where the magnetization direction is downward and through the pixel $11a$ of the magnetic layer 11 where the magnetization direction is downward is rotated by −90°, and the light becomes S-polarized light, too. Hereinafter, this light is referred to as a second on-light $ON_2$. The first on-light $ON_1$ and the second on-light $ON_2$ are together called on-light. Although both of the first on-light $ON_1$ and the second on-light $ON_2$ are S-polarized light, the phases are different from each other by 180°. Besides, in the spatial light modulator 61 shown in FIG. 16, light which has passed through the region of the optical rotatory layer 63 where the magnetization direction is downward and through the pixel 11a of the magnetic layer 11 where the magnetization direction is upward, and light which has passed through the region of the optical rotatory layer 63 where the magnetization direction is upward and through the pixel 11a of the magnetic layer 11 where the magnetization direction is downward both become P-polarized light, and are referred to as off-light OFF.

Accordingly, in the spatial light modulator 61 shown in FIG. 16, if light passing through the pixel 11a of the magnetic layer 11 corresponding to the region of the optical rotatory layer 63 where the magnetization direction is upward is to serve as the first on-light $ON_1$, the magnetization direction in the pixel 11a is to be set upward, and, if the light is to serve as the off-light OFF, the magnetization direction in the pixel 11a is to be set downward. Besides, if light passing through the pixel 11a of the magnetic layer 11 corresponding to the region of the optical rotatory layer 63 where the magnetization direction is downward is to serve as the second on light $ON_2$, the magnetization direction in the pixel 11a is to be set downward, and, if the light is to serve as the off-light OFF, the magnetization direction in the pixel 11a is to be set upward.

Since the arrangement pattern of the two kinds of regions of the optical rotatory layer 63 is known in advance, the light going out of the spatial light modulator 61 may be switched between on and off pixel by pixel, by setting the magnetization direction in each pixel 11a of the magnetic layer 11 according to the kind of the region of the optical rotatory layer 63.

As described above, the first on-light $ON_1$ and the second on-light $ON_2$ do not interfere with each other since their phases are different from each other by 180°. Therefore, according to the spatial light modulator 61 shown in FIG. 16, it is possible to reduce speckle noises generated in the on-light.

The remainder of the operation and effects of this embodiment are similar to the first embodiment.

The present invention is not limited to the above embodiments, but various modifications are possible. For example, the spatial light modulator of the invention may be of a transmission type not having the reflective layer 16.

As described above, according to the spatial light modulator of the invention, it is possible to enhance the function of the pixels to cause a rotation of the polarization direction of incident light depending on the magnetization direction, while the magnetic layer is allowed to be thin. Therefore, according to the spatial light modulator of the invention, it is possible to achieve improved magneto-optic performance, a high operation speed and low power consumption.

In the spatial light modulator of the invention, the first conductor layers and the second conductor layers may be placed to sandwich the magnetic layer. In this case, it becomes possible to apply a high magnetic field to the magnetic layer.

In the spatial light modulator of the invention, the first conductor layers and the second conductor layers may each include narrow portions each having a width smaller than that of another portion, and the narrow portions of the first conductor layers and the narrow portions of the second conductor layers may be arranged to overlap with each other. In this case, it is possible to generate high magnetic fields in the vicinities of the positions where the narrow portions of the first conductor layers and the narrow portions of the second conductor layers overlap with each other.

In the spatial light modulator of the invention, each of the narrow portions of the first conductor layers and each of the narrow portions of the second conductor layers may form a curved current path around the specific region in the pixel. In this case, it is possible to apply a high magnetic field to the specific region in the pixel.

In the spatial light modulator of the invention, the narrow portions of the first conductor layers and the narrow portions of the second conductor layers may be arranged to overlap with each other in the vicinities of the peripheries of the pixels. In this case, it is possible to reduce an influence exerted by the shapes of the first conductor layers and the second conductor layers on light modulated by the spatial light modulator.

The spatial light modulator of the invention may further comprise the optical rotatory layer that is provided to be adjacent to the incidence/outgoing plane and rotates the polarization direction of passing light by a predetermined angle by the magneto-optic effect. In this case, the polarization direction of light going out of the spatial light modulator can be set in a desired direction, which makes it possible to separate two kinds of light having different polarization directions from each other easily and at a high optical extinction ratio.

It is apparent from the above description that the present invention may be carried out in various modes and modifications. Therefore, the present invention may be carried out in modes other than the above-described best mode for carrying out the invention within the range of equivalence of the appended claims.

What is claimed is:

1. A spatial light modulator comprising:
    a magnetic layer that is made of a magneto-optic material and includes a plurality of pixels in each of which a magnetization direction is independently set and each of which has a function of causing a rotation of a polarization direction of incident light depending on the magnetization direction by a magneto-optic effect;
    a plurality of first conductor layers and a plurality of second conductor layers arranged to intersect with each other at positions corresponding to the individual pixels, through which currents for generating magnetic fields to set the magnetization directions in the individual pixels are passed; and
    a plurality of dielectric layers for enhancing the function of the pixels.

2. A spatial light modulator according to claim 1, wherein the magnetic layer, the first conductor layers, the second conductor layers and the dielectric layers constitute a one-dimensional magnetophotonic crystal.

3. A spatial light modulator according to claim 1, wherein the first conductor layers and the second conductor layers are placed to sandwich the magnetic layer.

4. A spatial light modulator according to claim 1, wherein the first conductor layers and the second conductor layers each include narrow portions each having a width smaller than that of another portion, and the narrow portions of the first conductor layers and the narrow portions of the second conductor layers are arranged to overlap with each other.

5. A spatial light modulator according to claim 4, wherein each of the narrow portions of the first conductor layers and each of the narrow portions of the second conductor layers forms a curved current path around a specific region in each of the pixels.

6. A spatial light modulator according to claim 4, wherein the narrow portions of the first conductor layers and the narrow portions of the second conductor layers are arranged to overlap with each other in the vicinities of peripheries of the pixels.

7. A spatial light modulator according to claim 1, wherein the first conductor layers and the second conductor layers are transparent to the incident light.

8. A spatial light modulator according to claim 1, further comprising: an incidence/outgoing plane on and of which light is incident and goes out; and a reflective layer that reflects light and is provided at a side opposite to the incidence/outgoing plane with the magnetic layer interposed therebetween.

9. A spatial light modulator according to claim 8, further comprising an optical rotatory layer that is provided to be adjacent to the incidence/outgoing plane and rotates a polarization direction of passing light by a predetermined angle by the magneto-optic effect.

10. A spatial light modulator according to claim 1, further comprising a magnetic domain wall movement inhibiting portion that is provided at a boundary position between adjacent ones of the pixels and inhibits movement of a magnetic domain wall beyond the boundary position.

11. A spatial light modulator according to claim 1, wherein the magnetic layer is formed of a magnetic garnet thin film.

12. A spatial light modulator according to claim 1, wherein the plurality of first conductor layers and the plurality of second conductor layers are arranged to intersect with each other at positions overlapping at least portions of the individual pixels.

* * * * *